(12) United States Patent
Mikuni et al.

(10) Patent No.: US 8,498,026 B2
(45) Date of Patent: Jul. 30, 2013

(54) IMAGE READER AND IMAGE FORMING APPARATUS

(75) Inventors: Yuichi Mikuni, Kanagawa (JP); YongHo Choi, Incheon (KR); Hiroaki Murakami, Kanagawa (JP); Shinji Yamasaki, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 364 days.

(21) Appl. No.: 12/859,475

(22) Filed: Aug. 19, 2010

(65) Prior Publication Data

US 2011/0096373 A1  Apr. 28, 2011

(30) Foreign Application Priority Data

Oct. 22, 2009  (JP) ................................ 2009-243850

(51) Int. Cl.
*H04N 1/04* (2006.01)
*G06K 1/00* (2006.01)
*G06K 15/00* (2006.01)
*G06K 9/40* (2006.01)
*G06T 5/00* (2006.01)
*B41J 13/24* (2006.01)

(52) U.S. Cl.
USPC ........ 358/474; 358/1.18; 358/1.12; 358/3.26; 358/1.9; 400/622; 382/274

(58) Field of Classification Search
USPC ............. 358/474, 1.12, 1.9; 400/622; 355/53; 248/188.8; 382/274
See application file for complete search history.

(56) References Cited

U.S. PATENT DOCUMENTS

| | | | |
|---|---|---|---|
| 7,221,808 B2 * | 5/2007 | Shinotsuka et al. | 382/274 |
| 2004/0156063 A1 * | 8/2004 | Vraa et al. | 358/1.12 |
| 2005/0185202 A1 * | 8/2005 | Tsue et al. | 358/1.9 |
| 2011/0073725 A1 * | 3/2011 | Aoyama | 248/188.8 |
| 2011/0116063 A1 * | 5/2011 | Morooka | 355/53 |
| 2011/0123246 A1 * | 5/2011 | Ando et al. | 400/622 |

FOREIGN PATENT DOCUMENTS

JP  A-2005-173117  6/2005

\* cited by examiner

*Primary Examiner* — Charlotte M Baker
*Assistant Examiner* — Rury Grisham
(74) *Attorney, Agent, or Firm* — Oliff & Berridge, PLC (57) ABSTRACT

An image reader includes a cabinet and an optical system. The cabinet has four plate members fixed to each other by laser welding from a side direction of the image reader and has a bottom wall fixed to the four plate members by laser welding from a side direction or a lower direction of the image reader. The cabinet has a first opening for a document read window opening toward an upper direction of the image reader. Each of the plate members is bended in letter L shape to form an upper end part and a side wall. The optical system is housed in the cabinet for reading an image of a document through the opening.

6 Claims, 9 Drawing Sheets

IMAGE READER AND IMAGE FORMING APPARATUS

CROSS-REFERENCE TO RELATED APPLICATIONS

This application is based upon and claims priority under 35 USC 119 from Japanese Patent Application No. 2009-243850, filed Oct. 22, 2009.

BACKGROUND

Technical Field

This invention relates to an image reader and an image forming apparatus.

SUMMARY OF THE INVENTION

According to an aspect of the invention, an image reader includes a cabinet and an optical system. The cabinet has four plate members fixed to each other by laser welding from a side direction of the image reader and has a bottom wall fixed to the four plate members by laser welding from a side direction or a lower direction of the image reader. The cabinet has a first opening for a document read window opening toward an upper direction of the image reader. Each of the plate members is bended in letter L shape to form an upper end part and a side wall. The optical system is housed in the cabinet for reading an image of a document through the opening.

BRIEF DESCRIPTION OF THE DRAWINGS

Exemplary embodiments of the invention will be described in detail based on the following figures, wherein.

DETAILED DESCRIPTION

Figure 1:
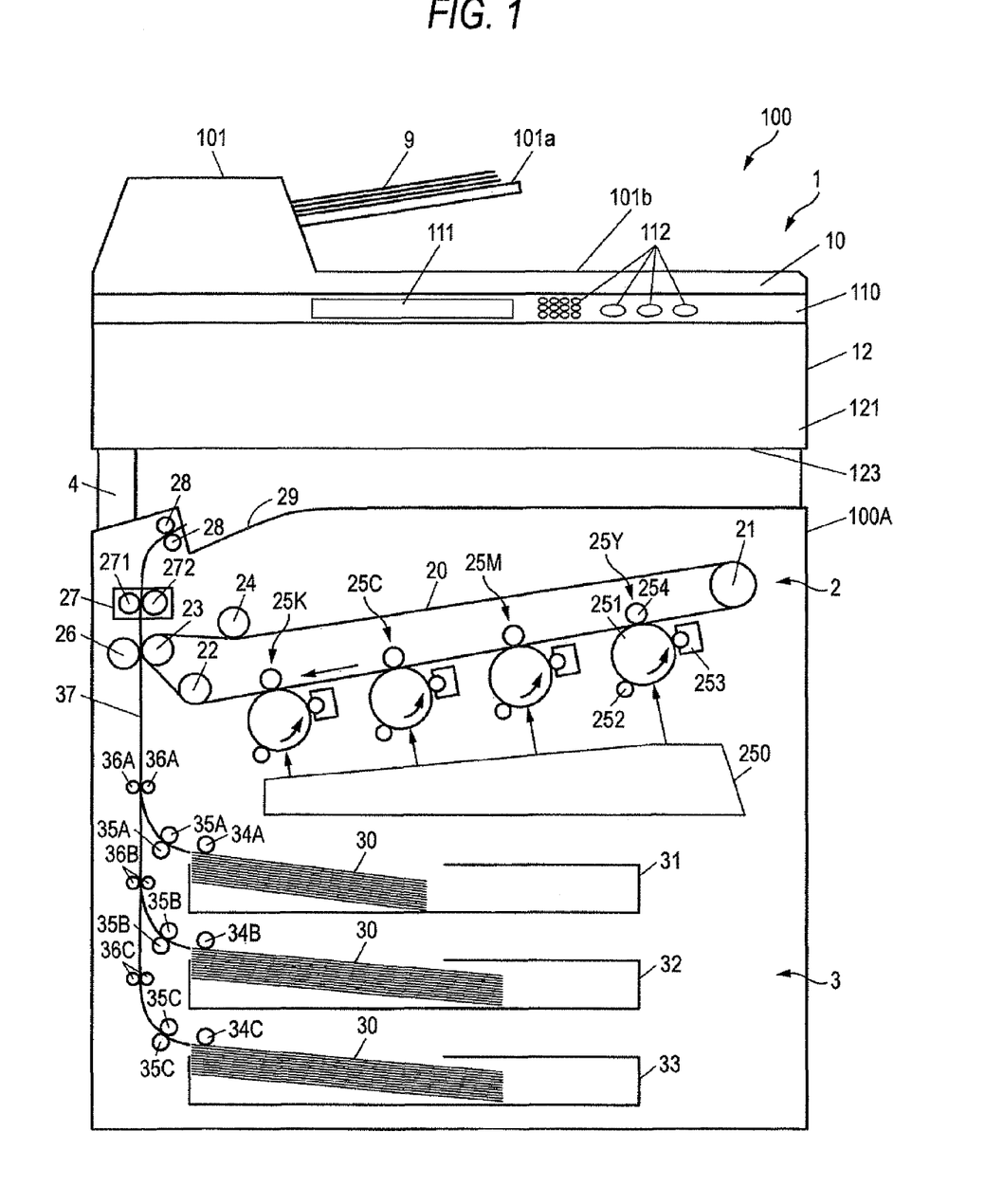
FIG. 1 is a drawing to show a configuration example of an image forming apparatus according to an exemplary embodiment of the invention.

FIG. 1 shows an image forming apparatus according to an exemplary embodiment of the invention. It shows the appearance of an image reader 1 and the internal structure of a main body section 100A placed below the image reader 1.

The image forming apparatus 100 is made up of the image reader 1 for reading an image from a document 9, an image forming section 2 for printing the read image on a sheet 30 as a record medium, and a tray section 3 for supplying a sheet to the image forming section 2. The image reader 1 is supported above the main body section 100A by a support section 4 so as to form a space where a printed sheet is discharged between the image reader 1 and the main body section 100A housing the image forming section 2 and the tray section 3.

A touch panel 111 for presenting an operation menu to the user and accepting operation of various settings, etc., and a control panel 110 having a plural operation buttons are provided on the top of a front wall 121 corresponding to the front of a cabinet 12 of the image reader 1. A document cover 10 that may be opened and closed relative to the cabinet 12 is placed above the control panel 110. An automatic sheet feed section 101 for conveying the document 9 placed in a sheet feed tray 101a to a read position and discharging the document 9 after read to a sheet discharge bed 101b is provided in a part of the document cover 10.

The image forming section 2 includes an intermediate transfer belt 20, first to fourth image forming units 25Y, 25M, 25C, and 25K for transferring color toner images of yellow (Y), magenta (M), cyan (C), and black (K) to the intermediate transfer belt 20, and an optical exposure 250 for applying laser light modulated based on image information to the first to fourth image forming units 25Y, 25M, 25C, and 25K.

The first image forming unit 25Y has a photoconductive drum 251, a charger 252 for uniformly charging the surface of the photoconductive drum 251, a developing device 253 for developing an electrostatic latent image formed by the optical exposure 250 in toner to form a toner image, and a primary transfer roller 254 for pressing the intermediate transfer belt 20 against the photoconductive drum 251. The second to fourth image forming units 25M, 25C, and 25K also have each a similar configuration to that of the first image forming unit 25Y.

The intermediate transfer belt 20 is driven by a drive motor 21 joined to a motor (not shown) and rotates along a circulation path formed by a first driven roller 22, a second driven roller 23, and a tension roller 24 for giving tension to the intermediate transfer belt 20.

The image forming section 2 includes a secondary transfer roller 26 placed at a position opposed to the second driven roller 23 across the intermediate transfer belt 20, a fixing unit 27 having a fixing roller 271 containing a heater and a pressure roller 272 pressed against the fixing roller 271, and a discharge roller 28 for discharging a sheet 30 passing through the fixing unit 27 to a discharge bed 29.

The tray section 3 has first to third trays 31 to 33 for storing sheets 30 different in orientation, size, sheet quality, etc., and placed in the up and down direction.

The tray section 3 includes pickup rollers 34A, 34B, and 34C for taking out the stored sheets 30, separation rollers 35A, 35B, and 35C for separating a plural sheets 30 when they are taken out, and registration rollers 36A, 36B, and 36C for further conveying the sheets 30 downward. The registration rollers 36A, 36B, and 36C operate in synchronization with the image forming timing of the image forming section 2 and introduce the sheets 30 taken out from the first to third trays 31 to 33 from the first to third trays 31 to 33 into space between the secondary transfer roller 26 and the intermediate transfer belt 20 along a conveying passage 37.

In the image forming apparatus 100, when the sheets 30 different in size and orientation are stored in the trays 31 to 33, each of the sheets 30 supplied from the trays 31 to 33 is conveyed so that the center of the sheet 30 almost matches the center of the conveying passage 37, and each sheet 30 is discharged onto a discharge tray 29 from a discharge roller 28.

(Configuration of Image Reader 1)

Figure 2:
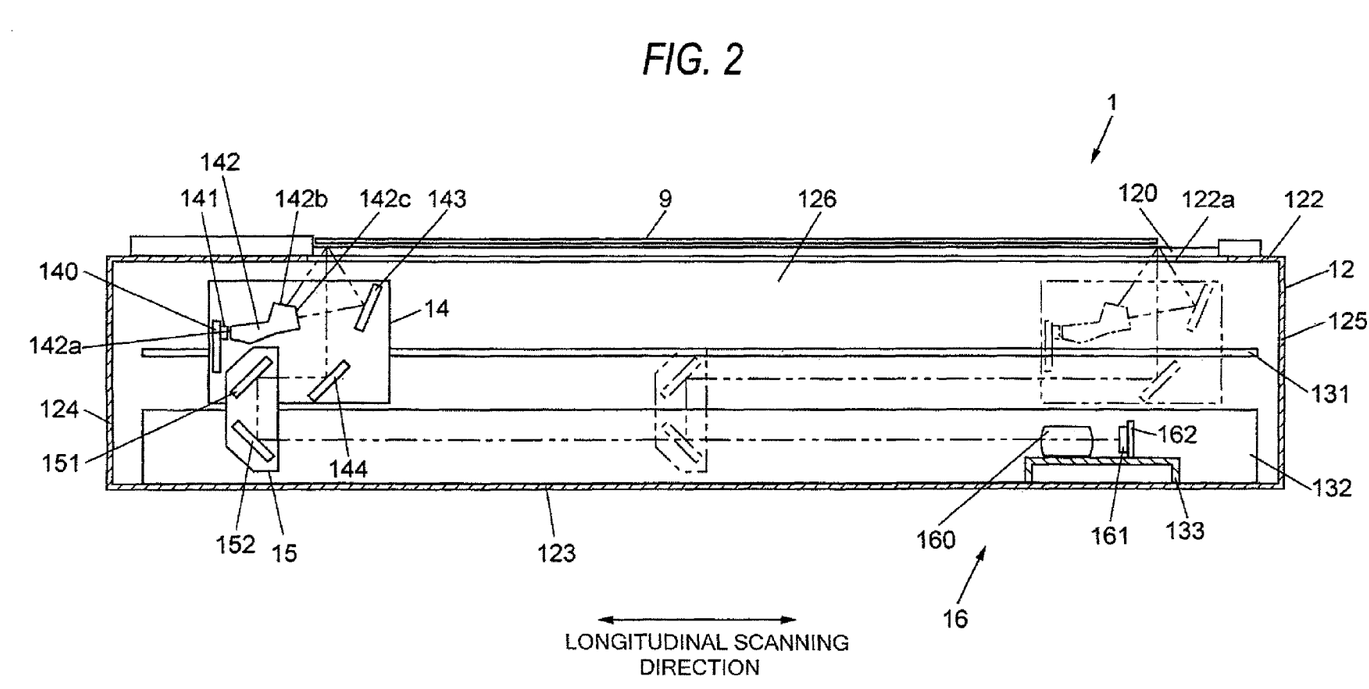
FIG. 2 is a schematic drawing to show the internal structure of an image reader.

FIG. 2 is a front view to show the internal structure of the image reader 1. In the figure, the document cover 10 is not shown. The image reader 1 is made up of first and second carriages 14 and 15 that may reciprocate in a subscanning direction and an optical system of an image read section 16 having a lens 160, a CCD (Charge Coupled Device) 161, etc., and the like in the cabinet 12.

The cabinet 12 is shaped like a box with an opened part of an upper wall 122 facing the document cover 10 and has a bottom wall 123 opposed to the upper wall 122, side walls 124 and 125 opposed to each other in the subscanning direction (left-right direction in FIG. 2) across the bottom wall 123, the above-described front wall 121 (see FIG. 1), and a back wall 126 opposed to the front wall 121 in a horizontal scanning direction (direction orthogonal to the plane of FIG. 2). The opening 122a of the upper wall 122 is covered with platen glass 120 on which the document 9 is placed.

A first rail 131 extending in the longitudinal scanning direction is fixed to the back wall 126. A second rail 132 extending in the longitudinal scanning direction is fixed to the bottom wall 123. Two first rails 131 and two second rails 132 are placed side by side in the transverse scanning direction, but only one is shown in FIG. 2.

A base plate 140 extending in the transverse scanning direction, a plural LEDs 141 mounted on the base plate 140 for emitting light applied to the document 9, a light guide body 142 provided in parallel with the base plate 140, a reflector 143 for reflecting a part of emission light from the light guide body 142 in the direction of the document 9, and a first mirror 144 for receiving reflected light from the document 9 are fixed to the first carriage 14.

The first carriage 14 applies light to an image read part of the document 9 while it is guided by the first rail 131 and moves together with the members of the light guide body 142, etc., in the longitudinal scanning direction and reflects reflected light of the document 9 toward the second mirror 151 of the second carriage 15 described later by the first mirror 144.

The light guide body 142 is formed of a material having optical transparency such as acrylic and has an incidence face 142a opposed to the LEDs 141, a first emission face 142b for emitting a part of the incidence light from the incidence face 142a in the direction of the document 9, and a second emission face 142c for emitting another part of the incidence light in the direction of the reflector 143.

The second mirror 151 for reflecting reflected light from the first mirror 144 and a third mirror 152 for reflecting reflected light from the second mirror 151 are fixed to the second carriage 15.

The second carriage 15 reflects the reflected light of the document 9 toward the lens 160 of the image read section 16 while it is guided by the second rails and moves in the longitudinal scanning direction.

The first carriage 14 and the second carriage 15 are driven by a drive mechanism (not shown) and the move amount of the second carriage 15 becomes a half of the move amount of the first carriage 14 so that the optical path length from the image read part of the document 9 to the CCD 161 described later does not vary while the first carriage 14 moves in the longitudinal scanning direction. The first carriage 14 and the second carriage 15 when the first carriage 14 moves to the vicinity of the end part in the longitudinal scanning direction of the document 9 are indicated by alternate long and two short dashes line in FIG. 2.

The image read section 16 has a base plate 162 on which the lens 160 and the CCD (Charge Coupled Device) 161 are mounted, fixed to a base board 133 supported on the second rail 132.

The image read section 16 is configured so that reflected light from the third mirror 152 passes through the lens 160 and forms an image and the image of the document 9 is read by the CCD 161.

(Structure of Cabinet of Image Reader)

Figure 3:
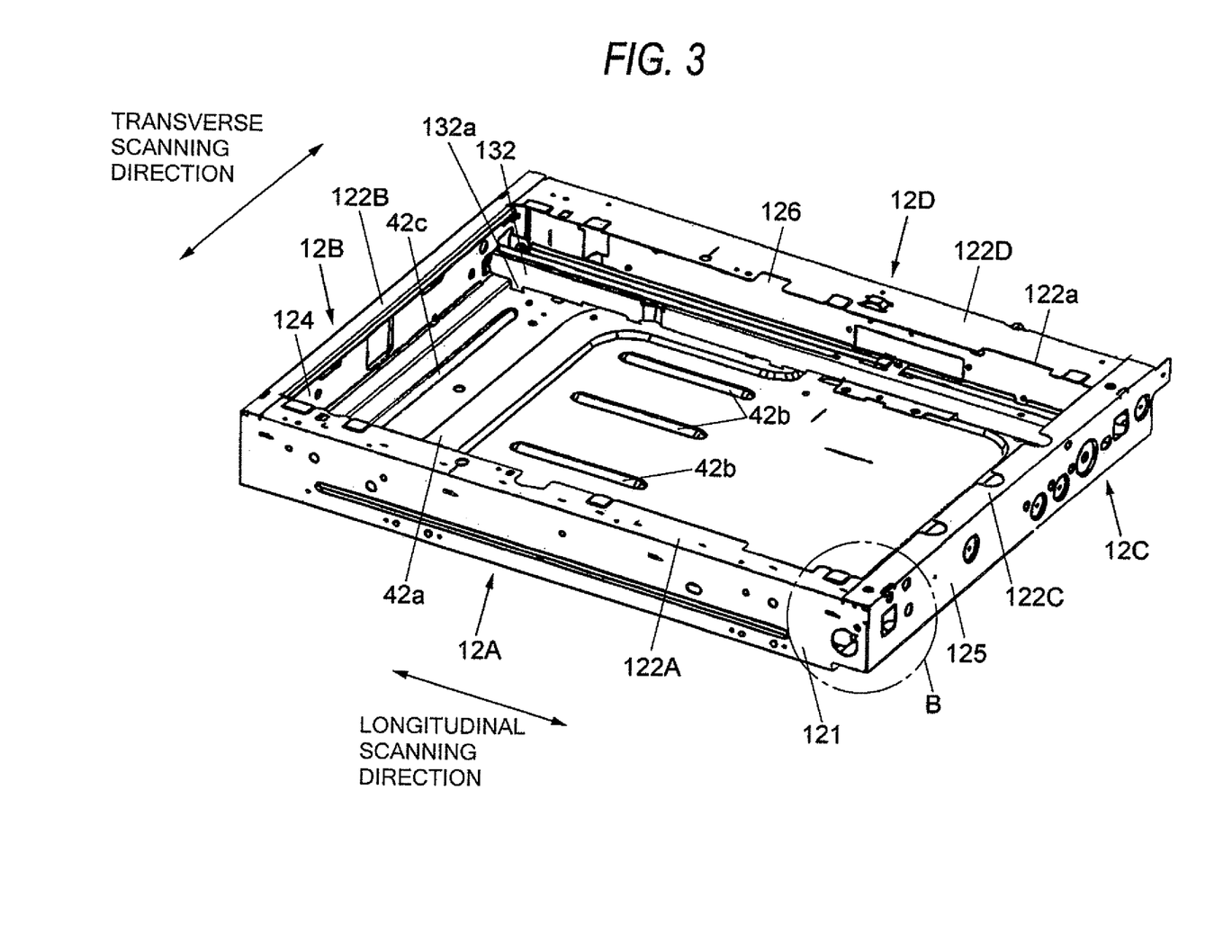
FIG. 3 is a perspective view of a cabinet of the image reader.
Figure 4:
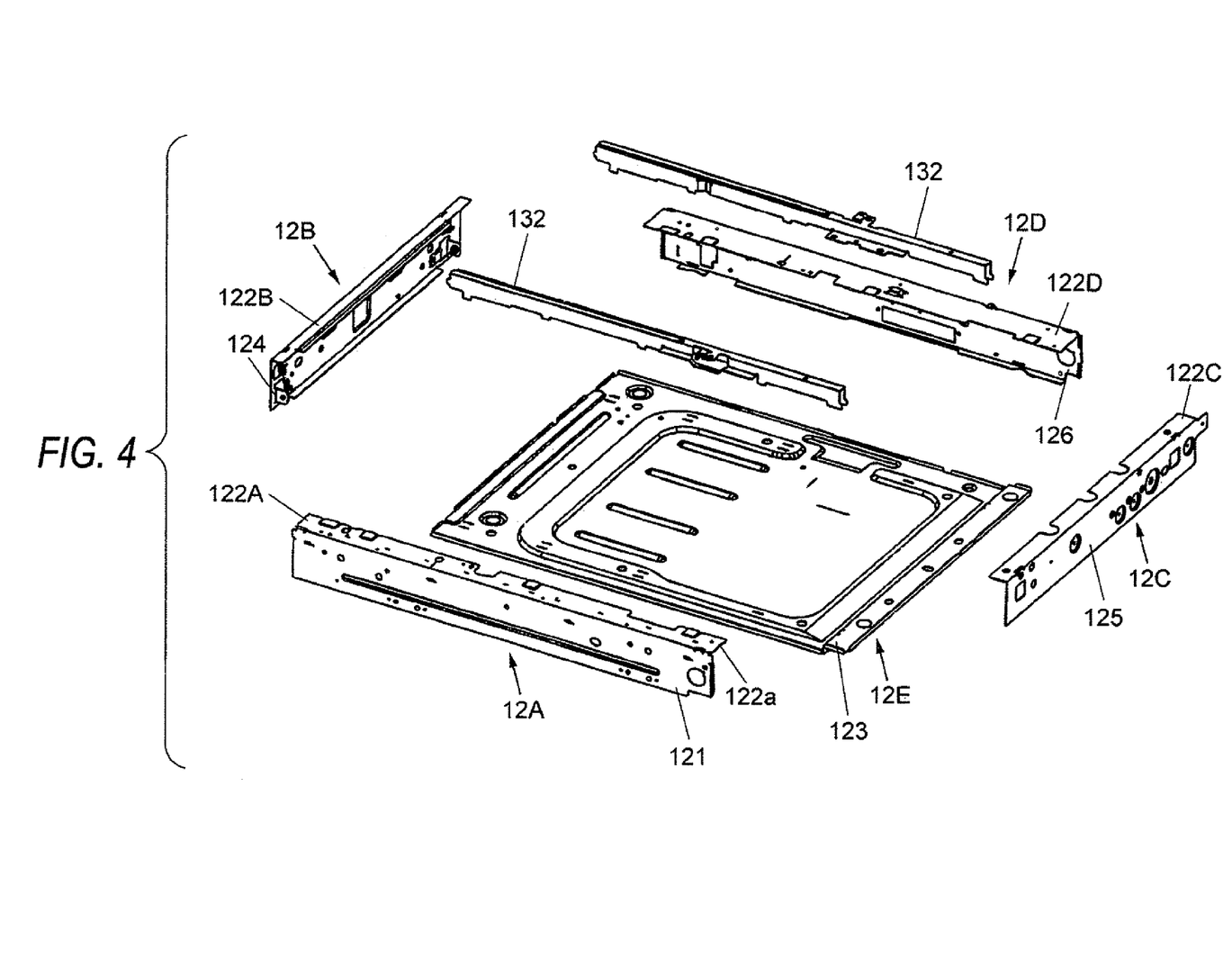
FIG. 4 is an exploded perspective view of the cabinet shown in FIG. 3.

FIG. 3 is a perspective view of the cabinet 12 of the image reader 1 and FIG. 4 is an exploded perspective view of the cabinet 12 shown in FIG. 3.

As shown in FIGS. 3 and 4, the upper wall 122 is made up of four upper walls 122A to 122D. The cabinet 12 is made up of five plate members 12A to 12E of the front wall 121 and the upper wall 122A, the side wall 124 and the upper wall 122B, the side wall 125 and the upper wall 122C, the rear wall 126 and the upper wall 122D, and the bottom wall 123; they are joined by laser welding. Each of the plate members 12A to 12E is formed by punching from a metal sheet of a steel material, etc., having a thickness of about 1 to 2 mm and bending, etc.

Figure 5:
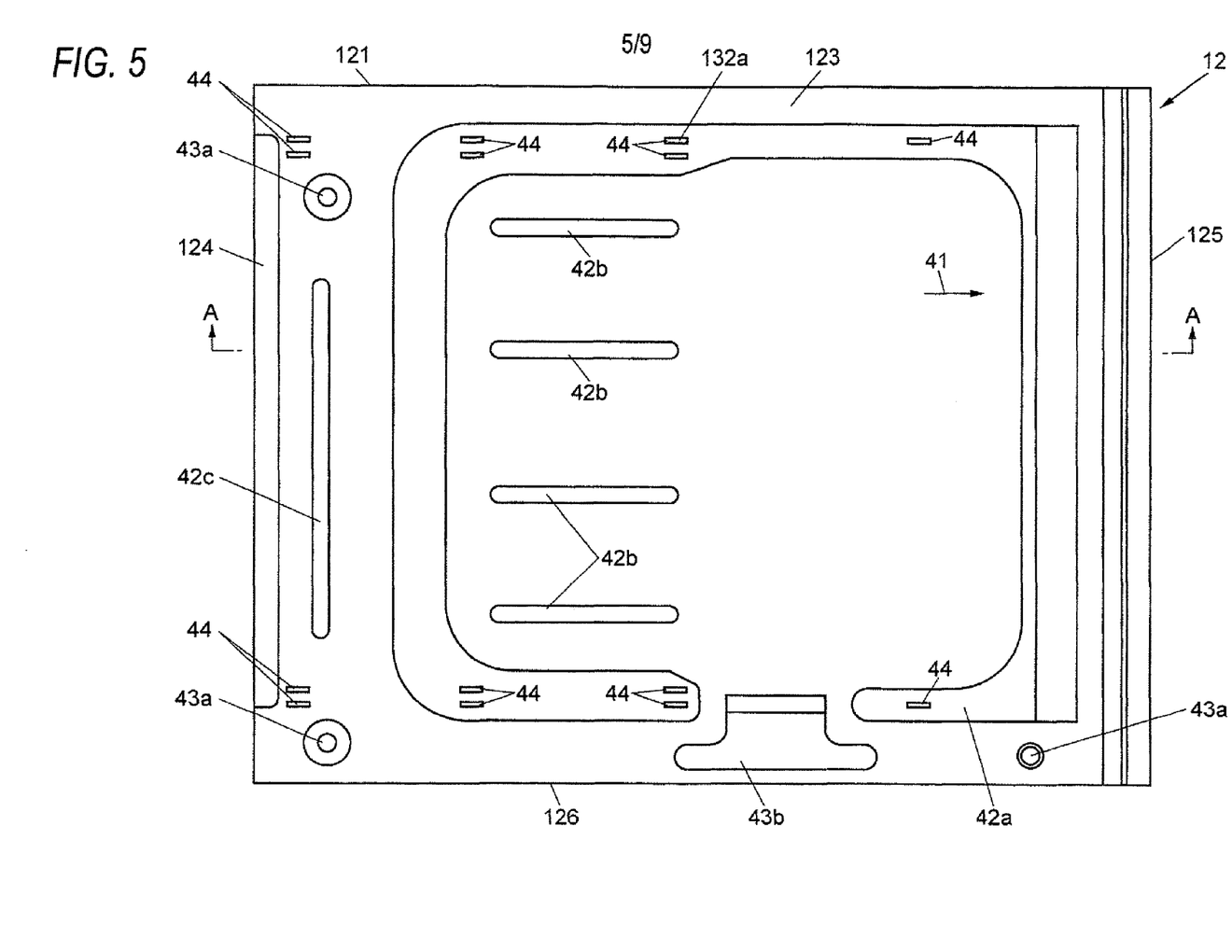
FIG. 5 is a bottom view of the cabinet of the image reader.
Figure 6:
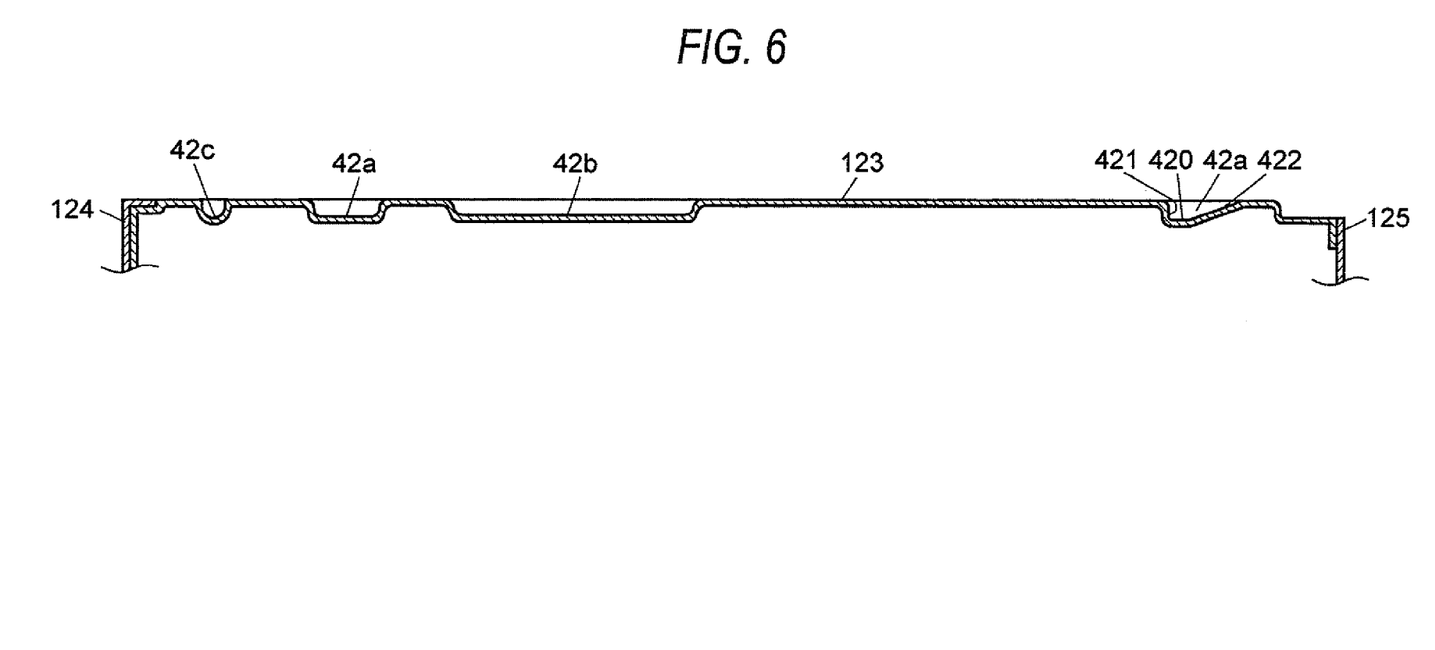
FIG. 6 is a sectional view taken on line A-A in FIG. 5.

FIG. 5 is a bottom view of the cabinet 12 of the image reader 1 and FIG. 6 is a sectional view taken on line A-A in FIG. 5.

To enhance rigidity, each part of the bottom wall 123 is subjected to drawing. That is, the bottom wall 123 of the cabinet is formed with a first concave part 42a having a first width in a roughly annular area, for example, an area shaped roughly like letter C and projecting to the inside of the cabinet 12, a plural second concave parts 42b provided inside the first concave part 42a, having a second width smaller than the first width in a linear area along a sheet discharge direction 41, and projecting to the inside of the cabinet 12, a third concave part 43c provided outside the first concave part 42a, having a second width in a linear area along the direction orthogonal to the sheet discharge direction 41, and projecting to the inside of the cabinet 12, first convex parts 43a provided in corners as three seats projecting to the outside of the cabinet 12, and a second convex part 43b provided in the vicinity of a gap shaped like letter C of the first concave part 42a and projecting to the outside of the cabinet 12 by drawing. The roughly annular area where the first concave part 42a is formed is not limited to a shape roughly like letter C and contains a shape roughly like a letter U, a roughly annular shape with a part cut, and a completely annular area with no cut and may be divided into a plural areas.

In the first concave part 42a, the portion on the paper discharge direction 41 side is made up of a bottom face 420, a side face 421 almost perpendicular to the bottom face 420, and a slope 422 inclined from the side face 421 and other portions are made up of bottom face 420 and a pair of side faces 421, as shown in FIG. 6. Accordingly, if the leading end of the print sheet 30 comes in contact with the slope 422, the leading end of the sheet 30 is not bent and the sheet 30 is smoothly discharged.

As shown in FIG. 5, projection portions 132a of the second rail 132 are inserted into the bottom wall 123 and plural welded openings 44 are formed along the vertical scanning direction. The projection portion 132a inserted into the opening 44 formed in the first concave part 42a is formed so as to scarcely project from the bottom face 420 of the first concave part 42a. The projection piece 132a inserted into the opening 44 formed other than the first concave part 42a is formed so as to scarcely project from the surface where the concave parts 42a to 42c and the convex parts 43a and 43b are not formed.

Both the concave parts 42a to 42c and the convex parts 43a and 43b are provided for the bottom wall 123 of the cabinet 12, whereby rigidity is enhanced and high strength is obtained as compared with the case where only concave parts or convex parts are provided.

(Weld Structure of Cabinet)

Figure 7:
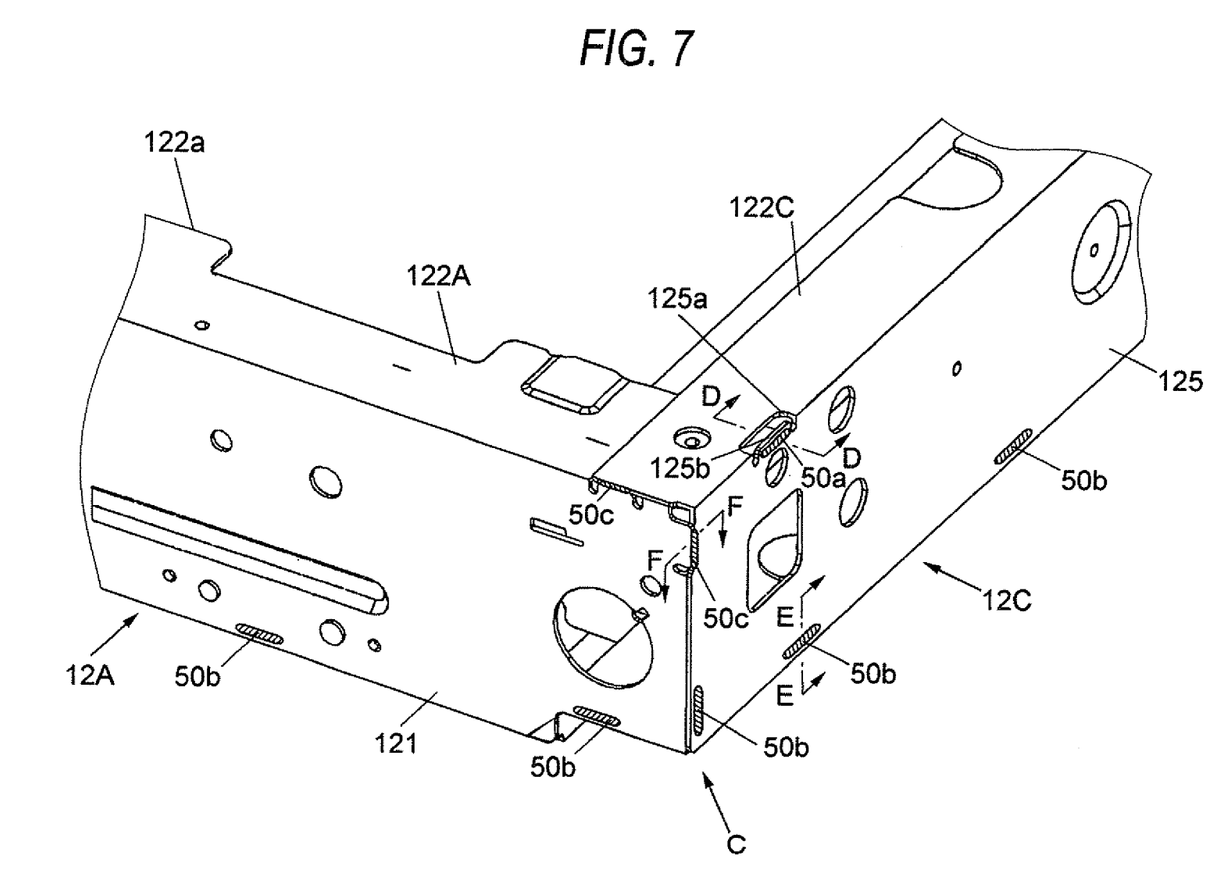
FIG. 7 is an enlarged drawing of B part in FIG. 3.
Figure 8:
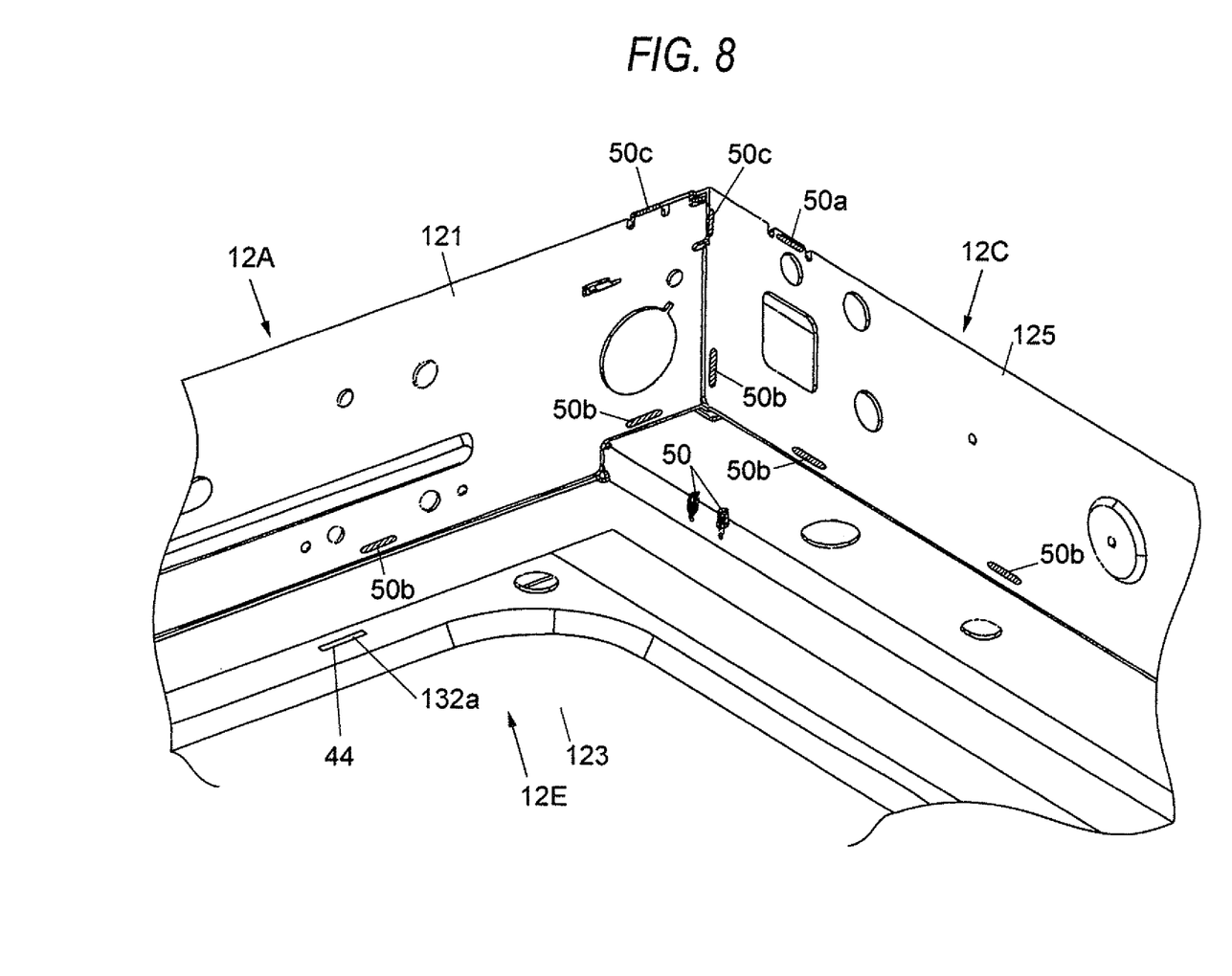
FIG. 8 is a main part perspective view from C direction in FIG. 7.
Figure 9A:
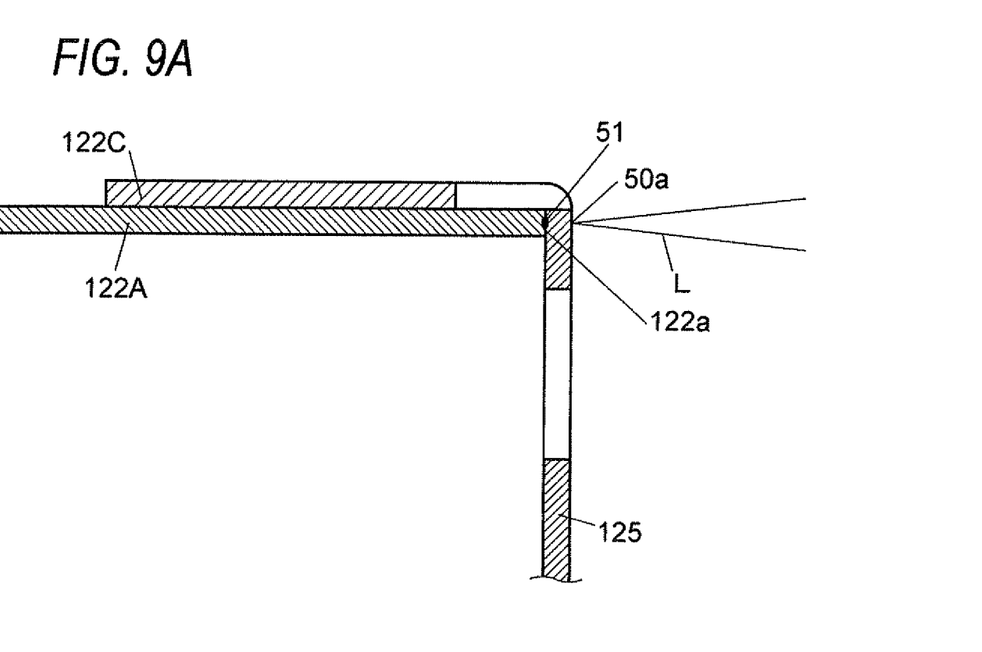
FIG. 9A is a sectional view taken on line D-D in FIG. 7.
Figure 9B:
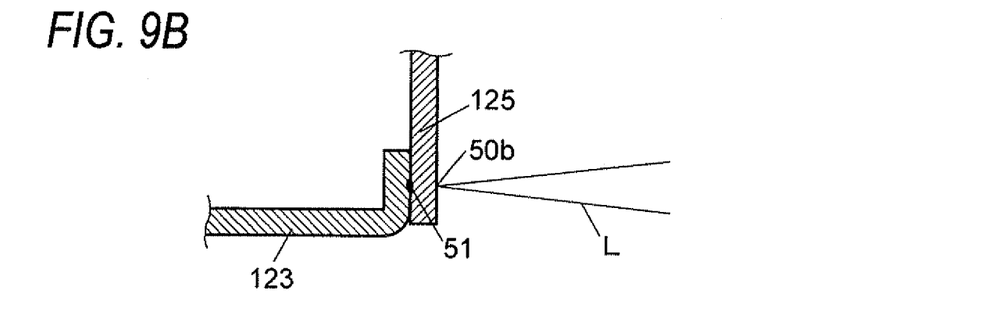
FIG. 9B is a sectional view taken on line E-E in FIG. 7.
Figure 9C:
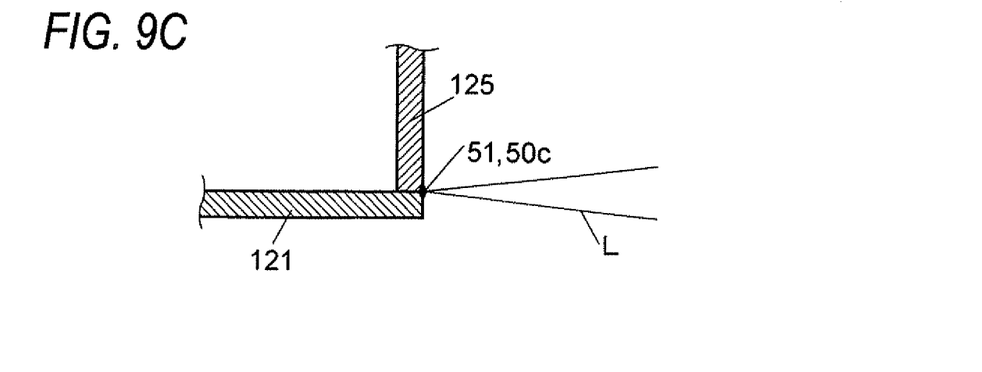
FIG. 9C is a sectional view taken on line F-F in FIG. 7.

FIG. 7 is an enlarged drawing of B part in FIG. 3, FIG. 8 is a main part perspective view from C direction in FIG. 7, and FIG. 9A is a sectional view taken on line D-D in FIG. 7; FIG. 9B is a sectional view taken on line E-E in FIG. 7; and FIG. 9C is a sectional view taken on line F-F in FIG. 7. In FIGS. 7 and 8, the hatched areas are weld parts 50 (50a, 50b, and 50c) subjected to laser welding.

The cabinet 10 has a structure (weld structure) wherein laser welding is performed from the side and the bottom and need not performed from the upper face where the opening 122a is formed. The characteristic portion of the weld structure will be discussed below:

(First Weld Part 50a Shown on Line D-D in FIG. 7)

As shown in FIG. 7, an opening 125a shaped like letter U is provided in the proximity of a bend part of the upper wall 122C and the side wall 125 of the plate member 12C and a weld target portion (remaining portion) 125a is formed inside the opening 125a shaped like letter U. As shown in FIGS. 7 and 9A, the upper wall (upper end part) 122C of the plate member (first plate member) 12C is put on one end part of the upper wall (upper end part) 122A of the plate member (second plate member) 12A, a weld target portion 125b of the side wall 125 is abutted against the end face 122a of the upper wall 122A of the plate member 12A, and is laser-welded. The upper wall 122A of the plate member 12A and the inner face of the weld target portion 125b are welded to form a joint part 51.

The first weld part 50a is also formed in other three corners of the cabinet 10, namely, a corner on an opposite end part side of the plate member 12A and corners on both end part sides of the upper wall 122D of the plate member 12D.

(Second Weld Part 50B Shown on Line E-E in FIG. 7)

A peripheral margin of the bottom wall 123 has a bend part 123 bend upward as shown in FIG. 9B, an outer face of the bend part 123a and an inner face of the side wall 125 are brought into contact with each other, and the bend part 123a and the side wall 125 are laser-welded. The outer face of the bend part 123a and an inner face of the side wall 125 are welded to form a joint part 51.

Lower parts on both end sides of the front wall 121 and the rear wall 126 also have a bend part bent inward, an outer face of the bend part and inner faces of side walls 124 and 125 are brought into contact with each other and are laser-welded as with the second weld part 50b shown on line E-E in FIG. 7.

(Third Weld Part 50C Shown on Line F-F in FIG. 7)

An inner face of the front wall 121 and an end face of the side wall 125 are brought into contact with each other and the contact part is a weld part 50c and is also a joint part 51. The third weld part 50c is also formed as described above in other three corners of the cabinet 10, namely, a corner on an opposite end part side of the front wall 121 and corners on both end part sides of the rear wall 126.

(Operation of Image Forming Apparatus)

Next, the operation of the image forming apparatus 100 will be discussed. When the user places the document 9 on the sheet supply tray 101a or the platen glass 120 and operates the touch panel 111 and the operation button 112 of the control panel 110 to give a copy command of the document 9, the image reader 1 starts to read an image. When the document 9 is placed on the sheet feed tray 101a, a control section (not shown) of the image reader 1 controls the automatic sheet feed section 101 to convey the document 9 to a read position on the platen glass 120.

The control section of the image reader 1 supplies current to the LEDs 141 and causes the LEDs 141 to emit light and also controls the drive mechanism to drive the first and second carriages 14 and 15 in the longitudinal scanning direction. Reflected light provided as light emitted from an emission face 5c of a light guide body 5 is reflected on the surface of the document 9 is reflected on the first mirror 144, a second mirror 151, and a third mirror 152 and is incident on the lens 160 of the image read section 16.

The light passing through the lens 160 forms an image in the CCD 161 and the image of the document 9 is read by the CCD 161. The control section of the image reader 1 sends image data as the read result of the image to an optical exposure 250 of the image forming section 2. After this, when reading the document 9 placed on the sheet feed tray 101a, the control section controls the automatic sheet feed section 101 to convey the document 9 to a discharge bed 101b.

The optical exposure 250 applies a light beam modulated based on color image data of YMCK to the photoconductive drum 251 charged by the charger 252 and forms an electrostatic latent image on the surface of the photoconductive drum 251. The electrostatic latent image is developed in toner by the developing device 253 to form a toner image. The toner image on the photoconductive drum 251 is transferred to the intermediate transfer belt 20 by the primary transfer roller 254.

On the other hand, from any one of the first to third trays 31, 32, 33, for example, the first tray 31, a sheet 30 is taken into the sheet conveying passage 37 by the pickup roller 34A and is separated by the separation roller 35A and then is conveyed to space between the secondary transfer roller 26 and the intermediate transfer belt 20 and the toner image on the intermediate transfer belt 20 is transferred to the sheet 30.

Then, the toner image on the sheet 30 is fixed by the fixing unit 27 and then is discharged to the discharge tray 29 by the discharge roller 28.

It is to be understood that the invention is not limited to the exemplary embodiment thereof and various modifications and changes may be made without departing from the spirit and the scope of the invention.

The foregoing description of the exemplary embodiment of the present invention has been provided for the purpose of illustration and description. It is not intended to be exhaustive or to limit the invention to the precise forms disclosed. Obviously, many modifications and various will be apparent to practitioners skilled in the art. The embodiments were chosen and described in order to best explain the principles of the invention and its practical application, thereby enabling other skilled in the art to understand the invention for various embodiments and with the various modifications as are suited to the particular use contemplated.

It is intended that the scope of the invention be defined by the following claims and their equivalents.

What is claimed is:

1. An image reader comprising:
 a cabinet that has four plate members fixed to each other by laser welding from a side direction of the image reader and has a bottom wall fixed to the four plate members by laser welding from a side direction or a lower direction of the image reader, the cabinet having a first opening for a document read window opening toward an upper direction of the image reader, each of the plate members is bended in letter L shape to form an upper end part and a side wall; and
 an optical system that is housed in the cabinet for reading an image of a document through the opening, wherein the bottom wall has a second opening into which a projection portion of a member for supporting a component to be housed in the cabinet is inserted, and the projection portion and an edge of the second opening are fixed by welding from a lower direction of the image reader.

2. The image reader according to claim 1, wherein the welding is laser welding.

3. The image reader according to claim 1, wherein
one of the plate members is a first plate member,
another one of the plate members is a second plate member which is adjacent to the first plate member,
the upper end part of the second plate member is put on the upper end part of the first plate member,
the second plate member has an U shape opening provided in a proximity of a bend part of the L shape of the second plate member, and
the upper end part of the first plate member is abutted against a given portion surrounded by the U shape opening of the second plate member and is fixed to the given portion by laser welding.

4. An image forming apparatus comprising:
an image reader that includes:
a cabinet that has four plate members fixed to each other by laser welding from a side direction of the image reader and has a bottom wall fixed to the four plate members by laser welding from a side direction or a lower direction of the image reader, the cabinet having a first opening for a document read window opening toward an upper direction of the image reader, an upper end part and a side wall of each of the plate members is bended in letter L shape; and
an optical system that is housed in the cabinet for reading an image of a document through the opening; and
an image forming section that forms an image on a recording medium based on information of the image read by the image reader, wherein
the bottom wall has a second opening into which a projection portion of a member for supporting a component to be housed in the cabinet is inserted, and
wherein the projection portion and an edge of the second opening are fixed by from a lower direction of the image reader.

5. The image forming apparatus according to claim 4, wherein the welding is laser welding.

6. The image forming apparatus according to claim 4, wherein
one of the plate members is a first plate member,
another one of the plate members is a second plate member which is adjacent to the first plate member,
the upper end part of the second plate member is put on the upper end part of the first plate member,
the second plate member has an U shape opening provided in a proximity of a bend part of the L shape of the second plate member, and
the upper end part of the first plate member is abutted against a given portion surrounded by the U shape opening of the second plate member and is fixed to the given portion by laser welding.

* * * * *